US007314394B2

(12) United States Patent
Darby

(10) Patent No.: US 7,314,394 B2
(45) Date of Patent: Jan. 1, 2008

(54) AMPHIBIOUS VEHICLE RETRACTABLE SUSPENSION

(75) Inventor: Christopher Paul Darby, Styvechale (GB)

(73) Assignee: Gibbs Technologies Ltd. (GB)

(*) Notice: Subject to any disclaimer, the term of this patent is extended or adjusted under 35 U.S.C. 154(b) by 404 days.

(21) Appl. No.: 10/851,016

(22) Filed: May 21, 2004

(65) Prior Publication Data
US 2005/0034911 A1 Feb. 17, 2005

(51) Int. Cl.
*B63F 3/00* (2006.01)
(52) U.S. Cl. ............................ 440/12.52; 440/12.66
(58) Field of Classification Search ............... 440/12.5, 440/12.51, 12.52, 12.54, 12.66
See application file for complete search history.

(56) References Cited

U.S. PATENT DOCUMENTS

| 5,145,205 | A | * | 9/1992 | Takehara et al. | 280/5.5 |
| 5,562,066 | A | * | 10/1996 | Gere et al. | 440/12.51 |
| 6,282,470 | B1 | * | 8/2001 | Shono et al. | 701/37 |
| 6,945,832 | B2 | * | 9/2005 | Roycroft | 440/12.52 |
| 2002/0000699 | A1 | * | 1/2002 | Ruddle | 280/5.5 |
| 2003/0047899 | A1 | * | 3/2003 | Gibbs | 280/124.157 |
| 2005/0239351 | A1 | * | 10/2005 | Darby et al. | 440/12.51 |

FOREIGN PATENT DOCUMENTS

| GB | 2 402 106 A | * | 1/2004 |
| GB | 2 402 108 | * | 12/2004 |
| WO | WO94/00332 A1 | | 1/1994 |
| WO | WO03/045716 A1 | | 6/2003 |

OTHER PUBLICATIONS

Combined Search and Examination Report for Application No. GB0411569.7; Jul. 21, 2004.
Combined Search and Examination Report for Application No. GB0411570.5; Jul. 21, 2004.

* cited by examiner

*Primary Examiner*—Sherman Basinger
(74) *Attorney, Agent, or Firm*—Calfee, Halter & Griswold LPA

(57) ABSTRACT

Amphibious vehicle (1, FIG. 1) has retractable road wheels (2, 2', FIG. 1). This may allow planing. During marine travel, at least one wheel may droop below the water line. This increases drag, particularly when cornering. Suspension height sensor 22 may be arranged to detect a threshold beyond which the wheel should not be allowed to droop over water, unless mode change is in progress. When this threshold is passed, pump 18 co-operates with controller 15 to pump fluid into lower chamber 7' of actuator 5 to retract the wheel. Switchable valves 9, 19, 21, and 23 are provided to allow adjustment of fluid chamber volumes. Gas filled accumulators 11 may be provided where a hydraulic suspension is used. Numeral 42 represents an adjustable trim tab. FIG. 4 shows an alternative fluid system layout, with valves 19, 19', and 110 to allow fluid to be returned to tank 18'.

40 Claims, 12 Drawing Sheets

AMPHIBIOUS VEHICLE RETRACTABLE SUSPENSION

The present application claims priority from GB Patent Application Serial No GB 0311962.5 filed on 24 May 2003.

TECHNICAL FIELD

The present invention relates to an amphibious vehicle with a retractable suspension system.

BACKGROUND OF THE INVENTION

Certain amphibious vehicles have a suspension system designed to allow the road wheels to be retracted above the vehicle waterline for use of the vehicle on water, particularly so as to reduce the hydrodynamic drag of the hull sufficiently to enable the vehicle to plane on water. Conveniently, said suspension may be retracted and protracted hydraulically. Alternatively, an air or gas suspension system may be used. Hydraulic struts may be used as described in the applicant's co-pending application, published as WO 01/74612. The mounting of these struts to the vehicle structure may be as described in the applicant's co-pending application, published as WO 02/44006. However, for the purpose of retraction when using a retraction cylinder as a suspension strut, as is shown in our International Patent Application Publication No WO 01/74612, where the invention relates to particulars of such a strut, the operation is only broadly described. A problem with the strut shown in Publication No WO 01/74612 is to ensure that the road wheels of the vehicle are safely lowered from the retracted position.

Since the fluid in the hydraulic suspension struts is substantially incompressible, accumulation space is provided in the arrangement of our co-pending application Wo 01/74612 to allow compression of the struts, so as to give a wheel travel in bump and rebound comparable to a wheel suspension using conventional steel springs. The problem with this arrangement is to control the accumulation, that is, the springing, so that when beaching, where an amphibious vehicle hits an obstacle on one side, the suspension does not cause the vehicle to tilt uncomfortably.

A further problem arises where ride height sensors are provided, and used in a ride height control system. When the vehicle is fording shallow water; passing over crests or hump back bridges; or being driven on water in displacement mode; all of the road wheels will tend to droop fully. The ride height control system will then act to pull the wheels up into the wheel arches. In fords, this may result in the vehicle floating, and thus deviating from its intended course. After crests, this could result in grounding. When driving on water in displacement mode, the keel could ground on leaving water. The cresting scenario lasts for typically less than a second, so the suspension may not have time to adjust, but it is preferred to switch off ride height control whenever the vehicle is on water.

A yet further problem may arise when the vehicle is on water with the wheels raised. Should a particular wheel droop; particularly a rear wheel; and particularly if the vehicle is planing; drag over water could be significantly increased, particularly when the vehicle is cornering. In theory, the use of a strut locking peg would prevent any wheel from drooping on water. However, such locking pegs are usually positioned so as to prevent the vehicle keel from grounding on land when the wheels are protracted. The geometry of the suspension may be such as to prevent a peg positioned for use on land from keeping a raised wheel above the water level in marine mode, particularly when the vehicle is cornering.

SUMMARY OF THE INVENTION

According to a first aspect of the invention, an amphibious vehicle has a retractable hydraulic suspension comprising hydraulic struts, gas charged accumulators, and at least one hydraulic fluid pump arranged to pressurise the struts and/or accumulators; the vehicle also comprising suspension strut fluid pressure sensors, and a fluid pumping control system including switchable valves; the control system arranged to switch fluid pumping flow from the hydraulic struts to the accumulators by means of the switchable valves during wheel movement from retracted to fully extended position, when one or more strut fluid pressure sensors indicate that a threshold fluid pressure has been reached. The vehicle may be a planing vehicle, whose hull has a deadrise. The vehicle may have two, three, four, or more road wheels. Pressure signals from two or more struts may be averaged to give a flow switching signal.

The advantage of the arrangement of the invention is that tipping is reduced when beaching and the vehicle's suspension mode change is more flexible.

Another advantage of the invention is when the vehicle is beached with the wheels up. In this case, in order to drive off the beach onto land, it is necessary to "bench press" the vehicle. This process comprises use of the lowering of the suspension to jack the vehicle off the ground and place it Can its wheels to make it roadworthy. If fluid is pumped into the suspension struts continuously, there will be a sudden rise in pump load; and a decrease in visible progress in mode conversion, when the wheels touch the ground. However, when the vehicle has a suspension configured according to the invention, the work done by the fluid pump is diverted to provision of springing.

This is a particular advantage where the amphibious vehicle is a planing vehicle, with a hull having deadrise; that is, a vee shape in lateral cross-section, with either side of the hull sloping upwards from a central keel. In this case, the vehicle may settle on the beach leaning to one side, as boats do; and will have a low side and a high side. If the vehicle is allowed to "find its own level" by pumping fluid to all of the suspension struts simultaneously, the wheels on the "low side" will touch the ground first. The pumped fluid will then naturally seek the path of least resistance, and will flow to the high side of the vehicle, extending the struts on that side.

This will result in the vehicle raising itself off the ground in a tilted attitude, and only correcting this tilt when the struts on the "high side" are fully extended, and can accept no more fluid. This again is uncomfortable and unnerving for the occupants. However, if the pumped fluid is directed to the accumulators rather than the struts, each wheel will extend equally, so that the vehicle will tend to level itself before it jacks itself off the ground. This gives the occupants a feeling akin to a boat rising on the tide, which feels natural and graceful.

If the road wheels are retracted during vehicle servicing or repair, they must be extended before driving away. Here again, the suspension control system advantageously must have some indication as to when to switch fluid inflow from the struts into the accumulators.

A timely completion of changeover from marine mode to land mode is advisable when the vehicle has left water, and is travelling over land. This changeover may comprise, for example, extinguishing of marine lighting and enabling of road lighting. Electro-mechanical ride height sensors may be provided, which will generally all indicate full strut extension when the vehicle is floating on water. When the vehicle lands, the struts will compress as they support the vehicle weight. Hence, the ride height sensors can detect landing, by sensing a rebound from full strut extension.

The amphibious vehicle of the invention may have a retractable suspension which comprises extensible struts and suspension ride height sensors, and a mode change control system, which is arranged to detect vehicle movement from travel over one medium to travel over another medium when at least, one ride height sensor indicates by signals that at least one strut has compressed from its full extension. The vehicle may be a planing amphibious vehicle, with two, three, four, or more road wheels. The ride height signals from two or more struts may be averaged or otherwise combined to give a flow switching signal. Alternatively, a signal may be given when all of the struts have rebounded. The struts and retractable suspension may be hydraulic, pneumatic, or otherwise gas-filled.

Where ride height sensors and ride height control are provided, such sensors may be arranged to detect at least a retracted and an extended position for each wheel. Ride height control may be switched off when suspension reaches full droop, and the vehicle is on water. This avoids the problems of wheels being pulled up towards the body, as described above. The "hump back bridge" scenario on road is covered by a minimum time threshold to adjust ride height, as is known in the automotive engineering art.

Ride height sensors may also be used to detect individual wheel droop on water. This allows the vehicle to raise wheels which have drooped on water. This has the advantage of maintaining a consistent low hydrodynamic drag whenever the vehicle is planing; particularly when cornering. This arrangement can be used with hydraulic, pneumatic, or gas suspension.

According to another aspect of the invention, an amphibious vehicle has retractable wheels and a retractable suspension comprising a fluid actuator acting as at least part of a suspension for each wheel, each actuator having a first chamber at a wheel raised first side, and a second chamber at a wheel lowered second side of the actuator, a fluid pump arranged to be coupled selectively to either the first or second chamber of each actuator, at least one fluid reservoir connectable to the actuators, each said chamber having at least one switchable valve in a conduit between that said chamber and the pump, a controller arranged to control each said valve, at least one ride height sensor arranged to detect at least a retracted and extended position for the corresponding wheel and to indicate those positions to the controller, a water presence sensor being arranged to indicate to the controller that the vehicle is on water, and the controller being arranged to maintain the wheels in an extended position in the presence of water on the water sensor. The vehicle may be a planing vehicle, whose hull has a deadrise. The vehicle may have two, three, four, or more road wheels. Signals from sensors for two or more struts may be averaged to give a control signal.

According to a further aspect of the invention, an amphibious vehicle has retractable wheels and a retractable suspension comprising a fluid actuator acting as at least part of a suspension for each wheel, each actuator having a first chamber at a wheel raised first side, and a second chamber at a wheel lowered second side of the actuator, a fluid pump arranged to be coupled selectively to either the first or second chamber of each actuator, each said chamber having at least one switchable valve in a conduit between that said chamber and the pump, a controller arranged to control each said valve, at least one wheel height sensor for each wheel arranged to detect at least a retracted and extended position and to indicate those positions to the controller, the controller being arranged to control the valves to individually adjust the relative fluid capacities of the first and second chambers of each actuator. The vehicle may be a planing vehicle, whose hull has a deadrise. The vehicle may have two, three, four, or more road wheels. Pressure signals from sensors for two or more struts may be averaged to give a flow switching signal.

Embodiments of the invention will now be described by way of example, with reference to the accompanying drawings in which.

Figure 1:
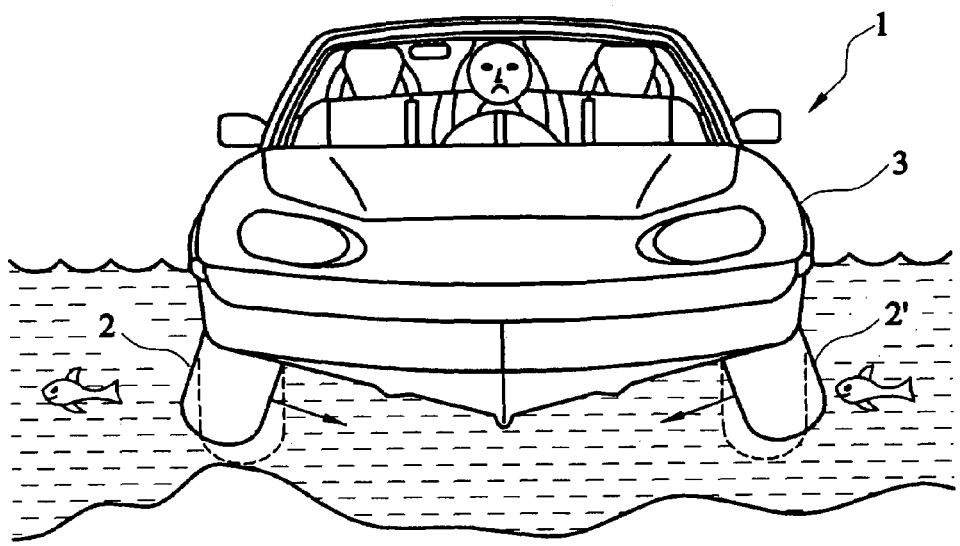
FIG. 1 is a diagrammatic front view of an amphibious vehicle according to the invention with its road wheels partly lowered whilst about to land.

FIG. 1 shows a front view of the general kind of amphibious vehicle 1 to which the present invention may be applied. This vehicle has retractable wheels, the front two 2, 2' of which are shown, so that it can convert from a road vehicle to a fast planing marine vehicle. Wheels 2, 2' retract into the body 3 of the vehicle. The wheels are shown in the process of lowering from the marine mode to the land mode position, which is shown in broken lines.

The approach to firm ground may result in a problem caused by, say, one wheel 2 landing before the other wheel 2'; and this will be discussed below.

Figure 2:
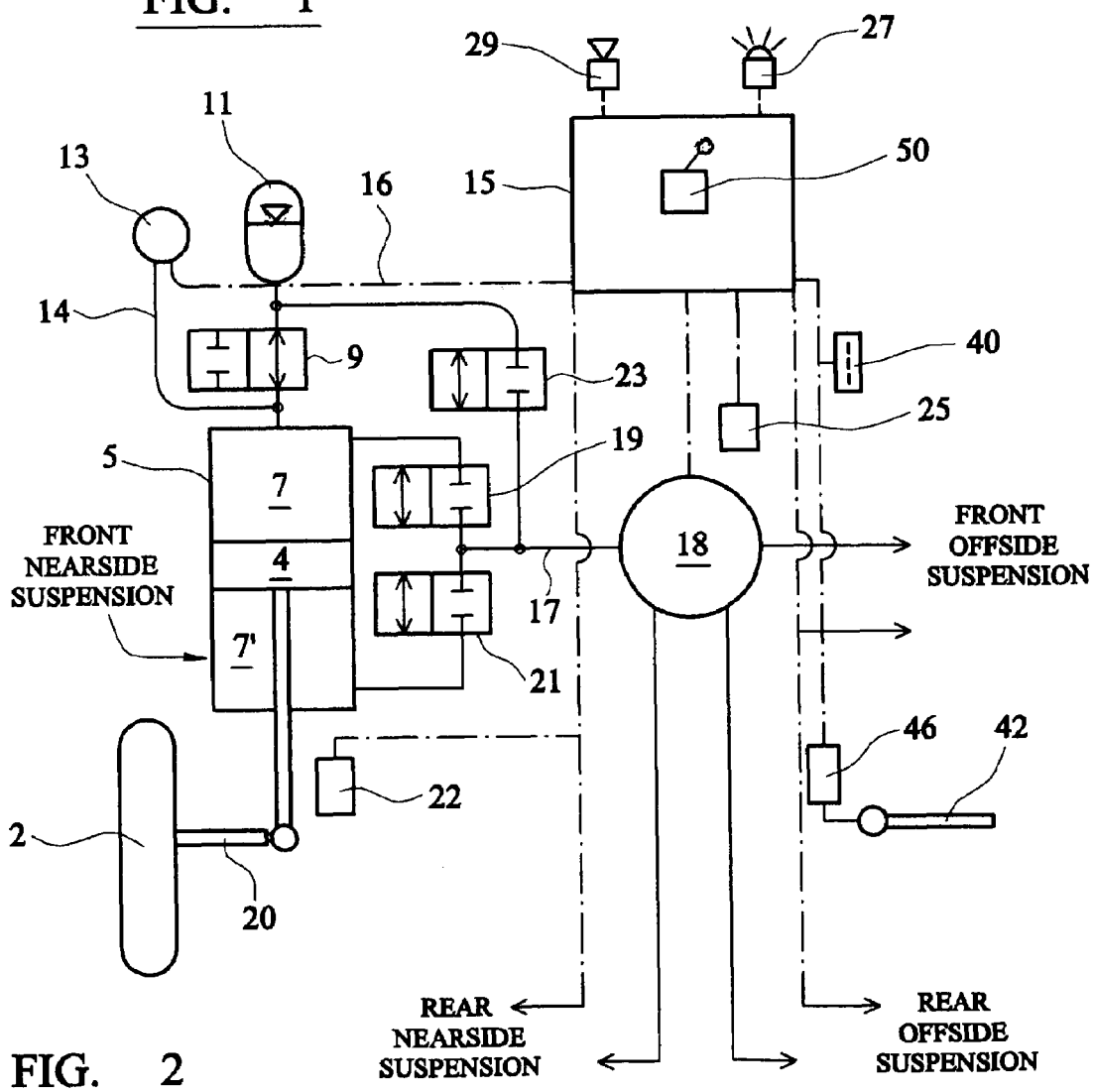
FIG. 2 is a hydraulic/electrical diagram of wheel suspension and trim tab controls for the vehicle of FIG. 1, showing a suspension system for one wheel only.

A very general and simplified diagram of the hydraulic arrangements for lowering (and retracting) the wheels is shown in FIG. 2. Here only one wheel 2 of the normal four is shown (but there may be more than four wheels; and a two or three wheeled vehicle may also use the invention).

In FIG. 2, wheel 2 is suspended from body 3 by suspension 20, part of which is piston 4 in cylinder 5 which forms a strut, the top part 7 of the cylinder being connected via shuttle valve 9 to accumulator 11. The pressure in upper part 7 of strut 5 is detected by sensor 13, connected via line 14 to part 7; and by sensor line 16 which may be electrical or hydraulic to controller 15.

The accumulator 11 is also connected via shuttle valve 23 (here it is disconnected) to line 17 from pump and hydraulic reservoir 18. Line 17 may also be connected (here shown disconnected) to upper part 7 or lower part 7' by shuttle valves respectively 19 and 21, so as to lower or respectively raise wheel 2. A sensor 22 detects the height of wheel 2, and another sensor 25 signals the vehicle's presence in water to controller 15. Lamp 27 indicates that the vehicle is in marine mode, whilst buzzer 29 sounds whilst the vehicle is, changing from marine to land mode or vice versa.

Controller 15 is arranged to function as set out in FIGS. 5 to 11, which are self-explanatory.

Figure 3:
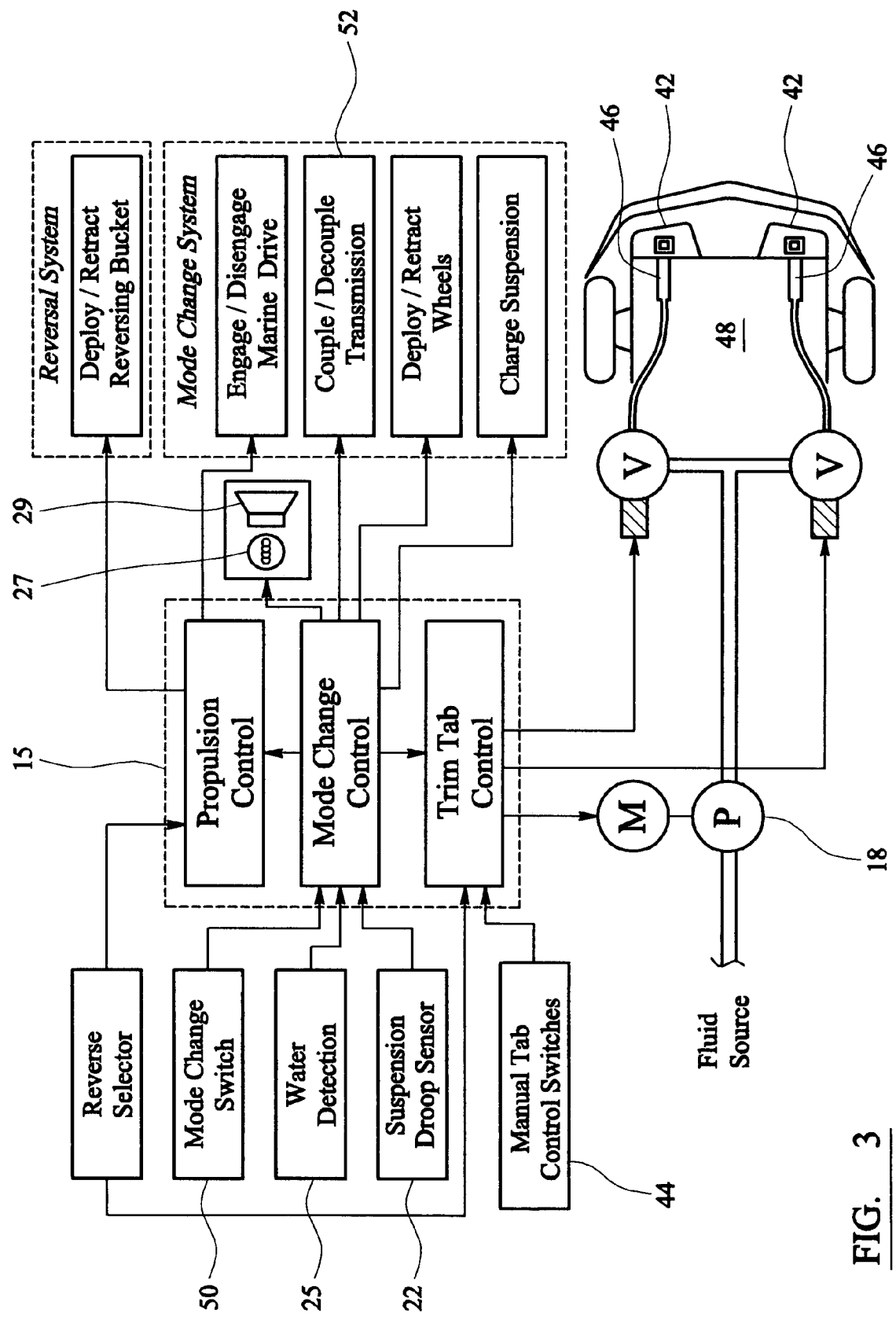
FIG. 3 is a block diagram of the control arrangement for the vehicle of FIG. 1.

In order to indicate the position of two trim tabs 42 at the rear end 48 (FIG. 3) of the vehicle, an indicator 40 comprising a vertical row of LED's is provided for each tab. The tabs 42 are controlled by means of manually operable switches 44 (FIG. 3), which operate electro-hydraulic motor/ pumps V connected hydraulically to actuator cylinders 46.

Figure 4:
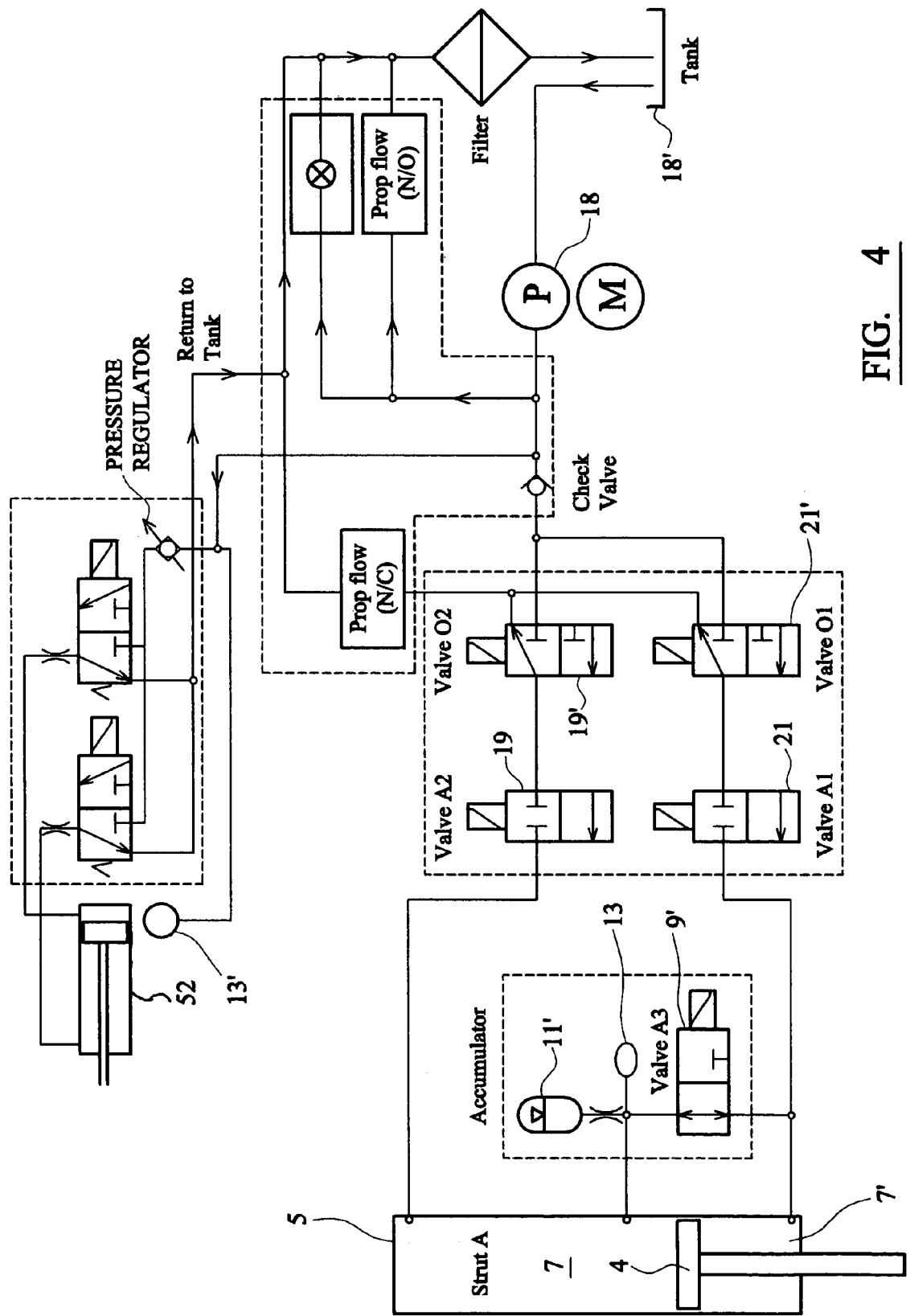
FIG. 4 is a diagram of the hydraulics for one of the wheels of the vehicle of FIG. 1 in steady state in land mode.
Figure 4A:
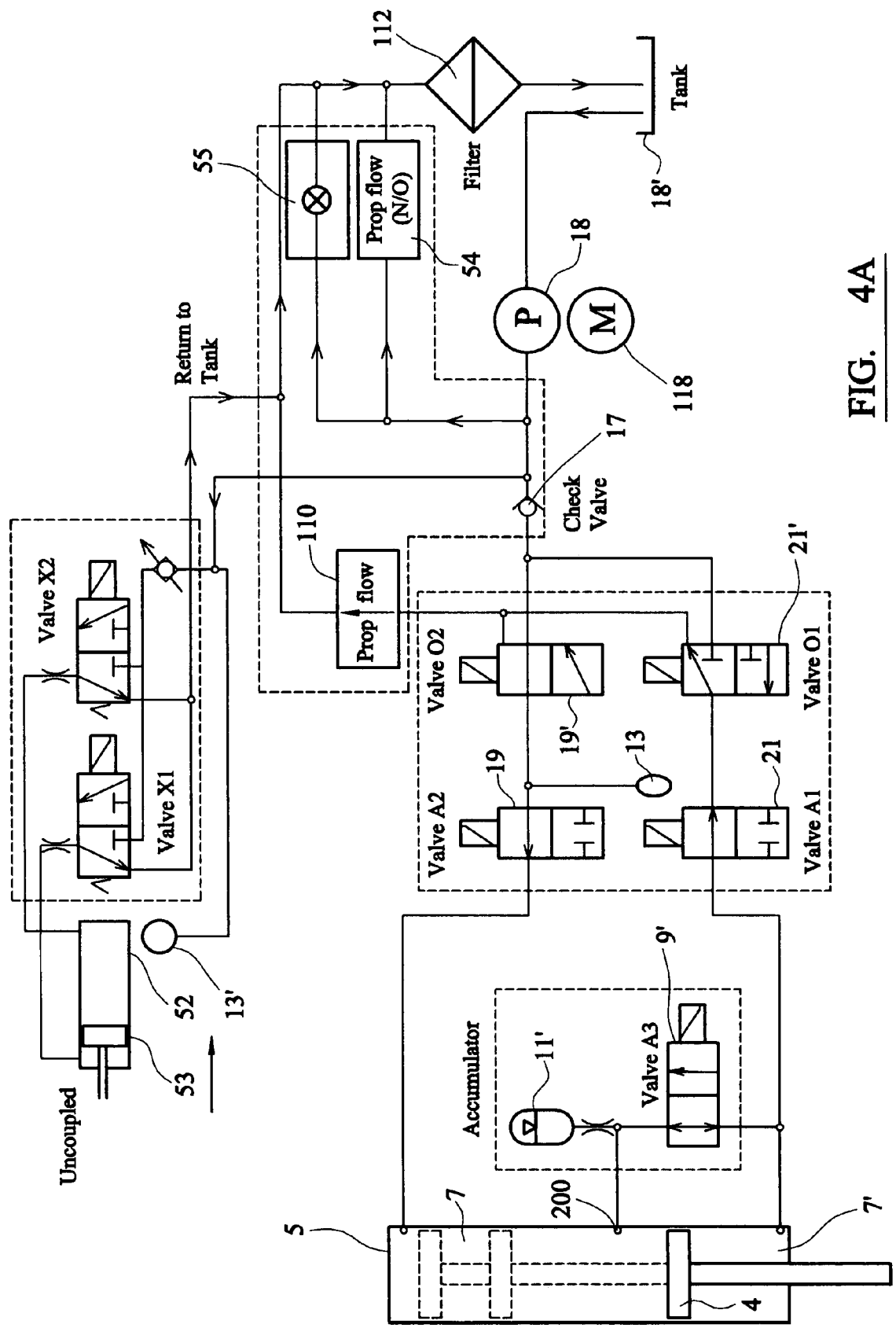
FIG. 4A is a diagram of the hydraulics for one of the wheels of the vehicle of FIG. 1 in a state where the suspension is being pumped up during conversion from marine mode to land mode, before wheel touchdown.
Figure 4B:
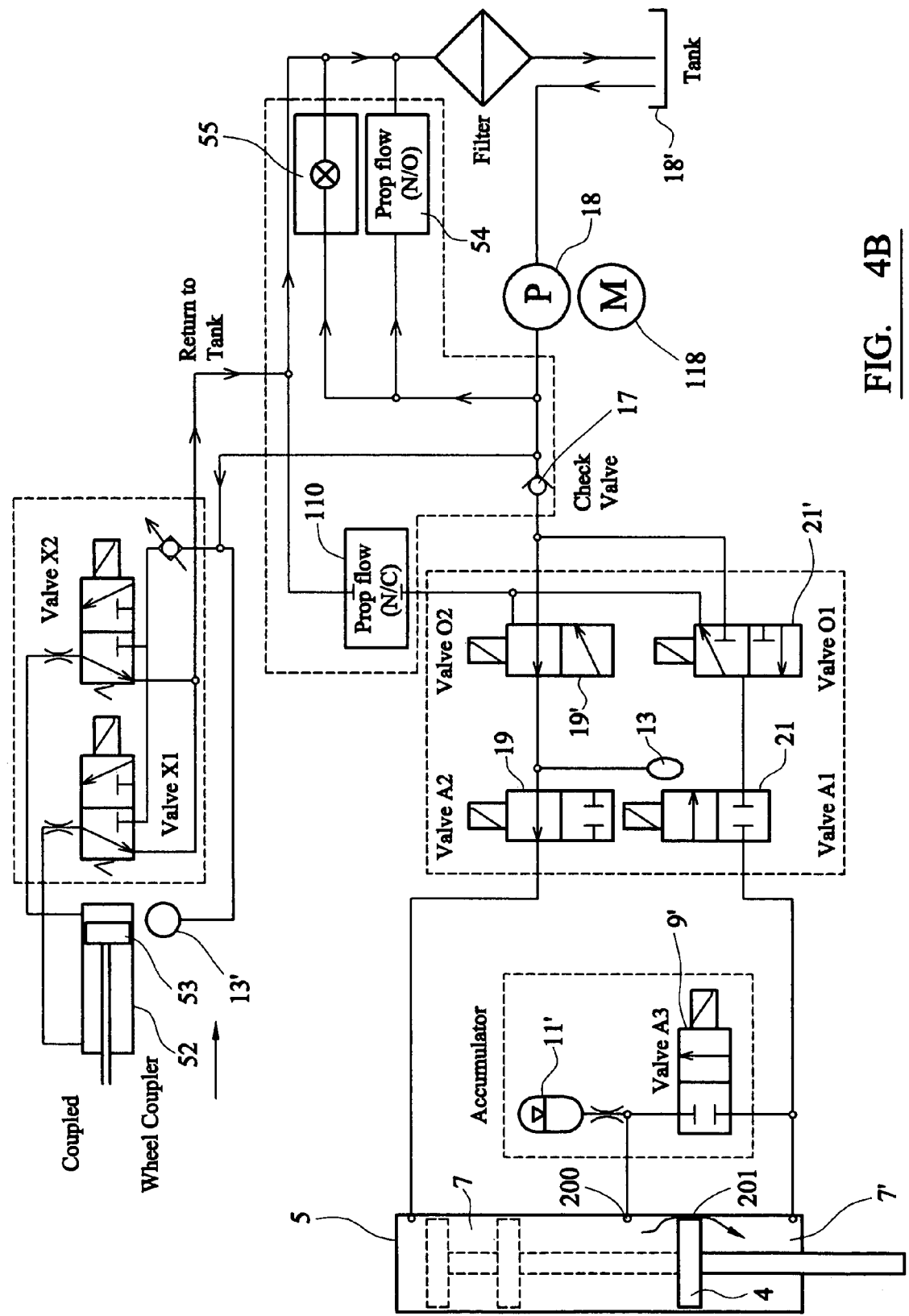
FIG. 4B is a diagram of the hydraulics of FIG. 4A where the suspension is being pumped up after wheel touchdown.

In order to describe the wheel strut movement in two states, FIGS. 4A and 4B show hydraulic valves positioned according to suspension pumping up before wheel touchdown (FIG. 4A), and after wheel touchdown (FIG. 4B). FIG. 4, by contrast, shows a static state in land mode for comparison. These figures all show a fixed choke 12, which may be used to restrict passage of fluid into or out of the accumulator, ensuring that telescoping of cylinder 5 is given preference over accumulator charging or discharging.

In order to lower, that is, to protract, the wheels, it is first necessary to remove or disengage a strut lock pin. For simplicity, this is not shown in the drawings. A suitable strut lock pin arrangement is shown in our co-pending British Patent Application No GB 0400826.4, the contents of which are incorporated herein by reference.

Next valves 19, 19', and 21 are activated so as to assume the open positions shown in FIG. 4A. Valve 9' is closed. The pump 18, which is driven continuously by an engine, here shown symbolically as motor 118, pumps hydraulic fluid from reservoir 18' past check valve 17 and valves 19' and 19, into upper chamber 7 of strut cylinder 5. Fluid from lower chamber 7' is vented through valves 21 and 21' to normally closed proportional flow valve 110, now open to allow fluid to vent to reservoir 18' past filter 112.

Once piston 4 of the strut passes mid port position 200 and the wheels touch down or the strut bottoms out, the passage of fluid through the strut decreases dramatically, although as shown at 201 (FIG. 4B), there is a deliberate slight leakage around each strut piston 4. When said decrease in flow occurs, a steep rise in pressure occurs as detected by sensor 13. Because of the leakage at 201, the strut threshold pressure is lower than the pump pressure. In one embodiment, this lower threshold pressure is about half pump pressure. It is also less than the full suspension charge pressure, as pumping continues after this threshold is reached.

When the threshold pressure is reached, valve 21 is closed and the fluid from pump 18 continues to pressurise the upper chamber 7 and accumulator 11'. For a planing vehicle, weight will typically be biased towards the rear of the vehicle, so that higher suspension pressure is required in the rear suspension. For example, whilst the front wheel struts reach a full pressure of 50 bars, the rear wheel struts continue to be pumped up to a full pressure of 90 bars.

When each pair of wheel struts reach their full predetermined pressure as detected by sensor 13 between valves 19 and 19', and the accumulators are fully charged, valves 19 (A2), 21' (O1), 19' (O2) and proportional flow valve 110, are closed., as is check valve 17. Valve 9' (A3) then opens. Wheel decoupler valve X1 is opened as shown in FIG. 4B and decoupler piston 53 in cylinder 52 moves to couple the wheels to the drive train driven by engine 118. The position of piston 53 is sensed by sensor 13'. Pump 18 continues running, but fluid pressure is bypassed back to reservoir 18' via normally open proportional flow valve 54 and bypass valve 55.

To raise the wheels, the wheel height detector 22 checks for wheel droop and then as a safety check, detector 25 checks the vehicle is in water. The wheel retraction is then commenced at about the same time as valve X2 is operated to decouple the road wheels from the drive train, moving decoupler piston 53 to the left as shown in FIG. 4A.

For wheel retraction, valve 9' (A3) is closed as well as bypass valves 55 and 54; whilst valve 19' (O2) is switched to allow fluid to flow through now open valve 19 (A2) from chamber 7 to reservoir 18'. Valves 21' and 21 are open to pump 18 and chamber 7', causing piston 4 to rise in strut cylinder 5 until piston 4 reaches its upper limit. A signal from sensor 22 instructs controller 15 to close valves 19 and 21; and bypasses 55 and 54 are opened. The strut pin (not shown) is then inserted to lock the strut up in the "wheel retracted" position.

The operation of the controller 15 is as follows:

(i) Mode change switch 50 connected to controller 15 is activated manually for 3 to 10 seconds. This prevents accidental mode change sequencing from starting. Provided the time requirement for switch 50 activation is met, the marine mode light 27 and buzzer 29 are switched on and respectively sound (see FIG. 3).

Figure 5:
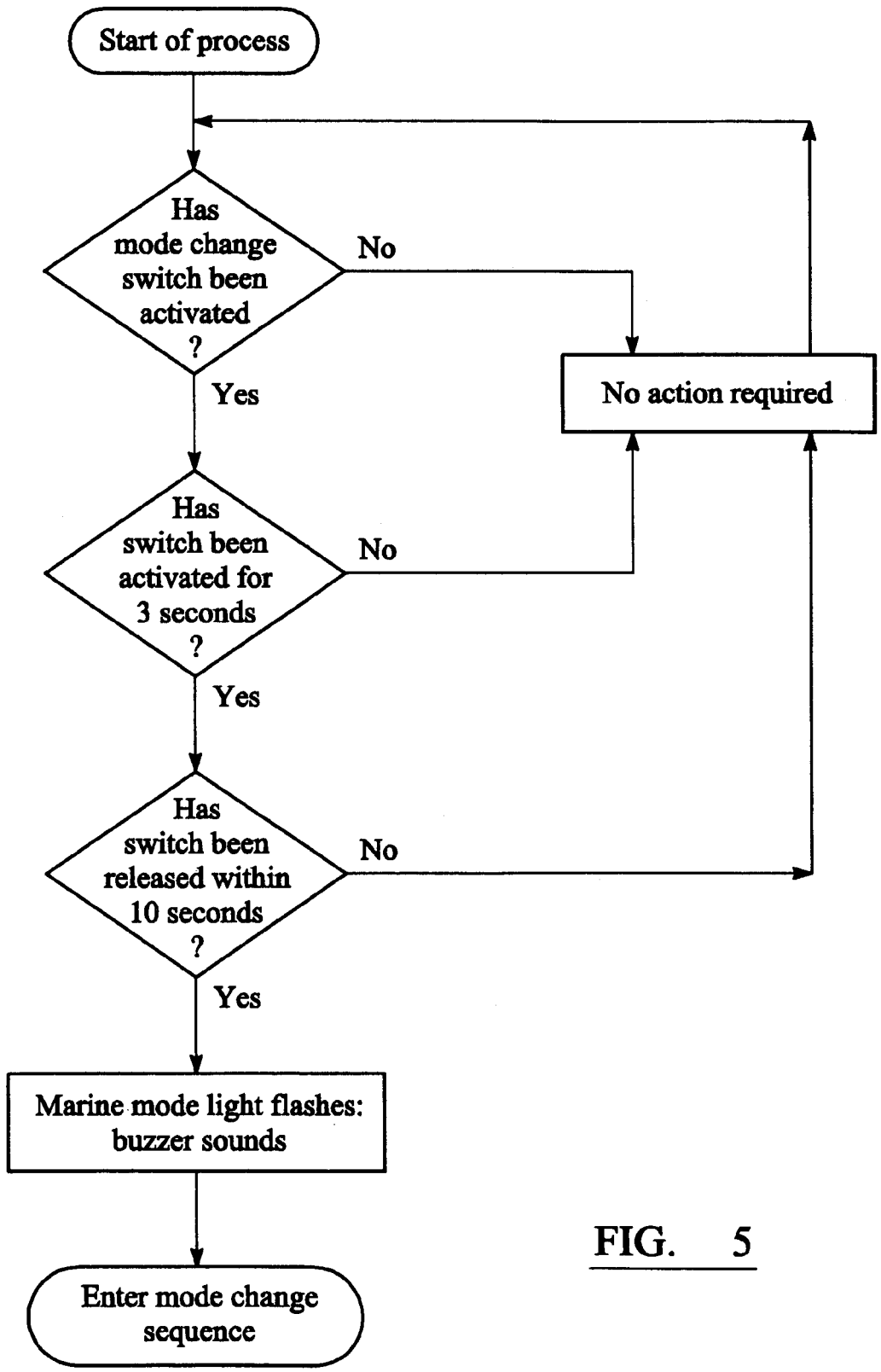
FIG. 5 is a logic diagram showing the first stage of mode change from land mode to marine mode, or vice versa, for a vehicle according to FIG. 1.

(ii) As the vehicle enters the water, the buoyancy of the vehicle takes the weight off the suspension struts and the wheels (2, 2') droop. Sensor 22 detects the extent of the droop and informs the controller, when a predetermined droop threshold is reached. The controller then checks water entry by means of sensor 25 and shuttle valves 21, 21' and 19 are opened, and valve 9' closed, to pressurise by means of constantly running pump 18 the lower part 7' of strut 5 to raise wheels 2, 2'. Pump 18 draws fluid from reservoir 18' (see FIG. 4). The road wheels are then decoupled from the transmission by means of decoupler(s) 52; the buzzer 29 is switched off (the marine mode light 27 remains on); and trim tabs 42 are deployed. A check is made by the controller to ensure the wheels 2, 2' are fully retracted so that the vehicle is in a condition to accelerate into planing mode (FIG. 5).

Figure 6:
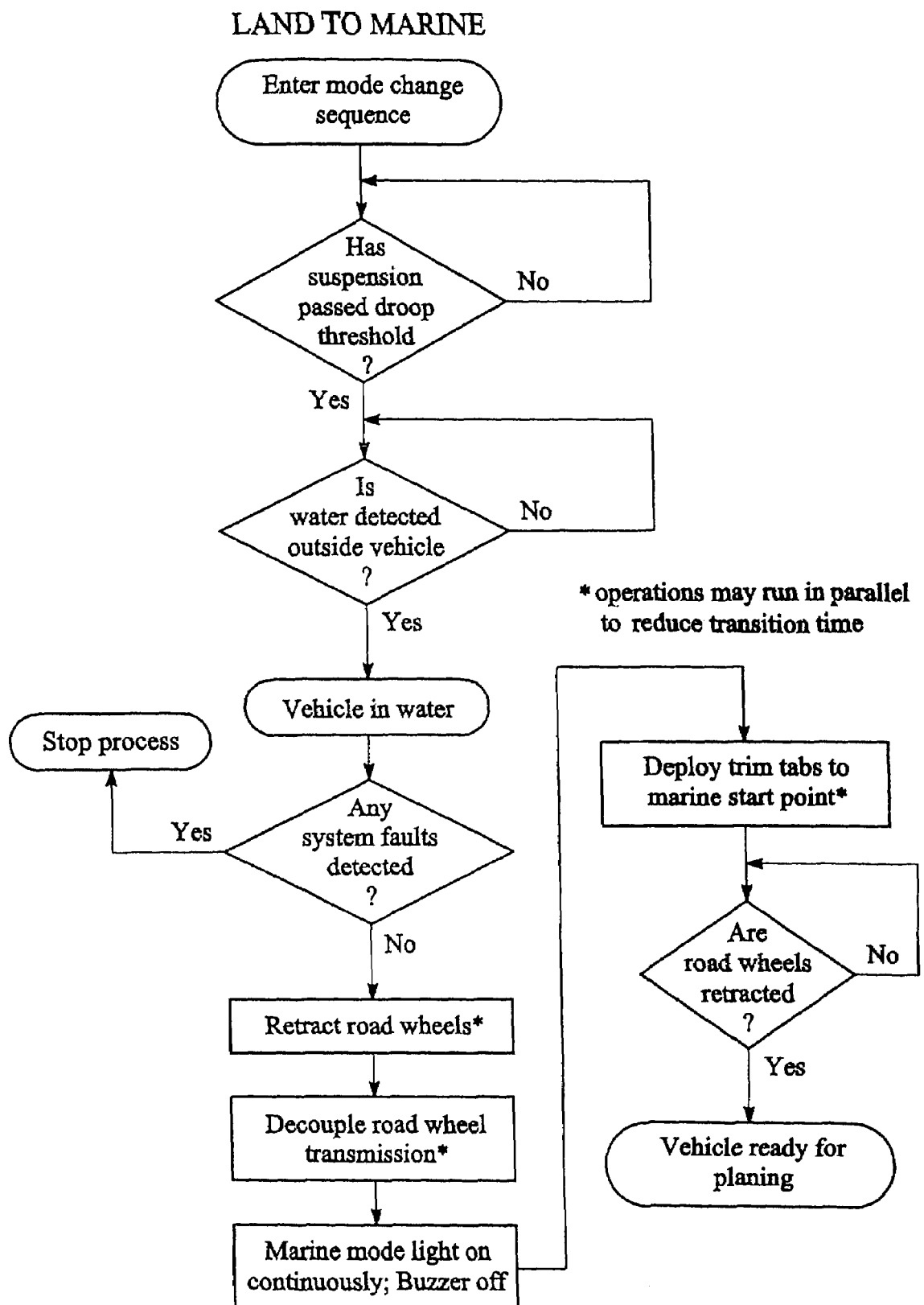
FIG. 6 is a logic diagram showing the second stage of mode change for the vehicle of FIG. 1, changing from land to marine mode.
Figure 7:
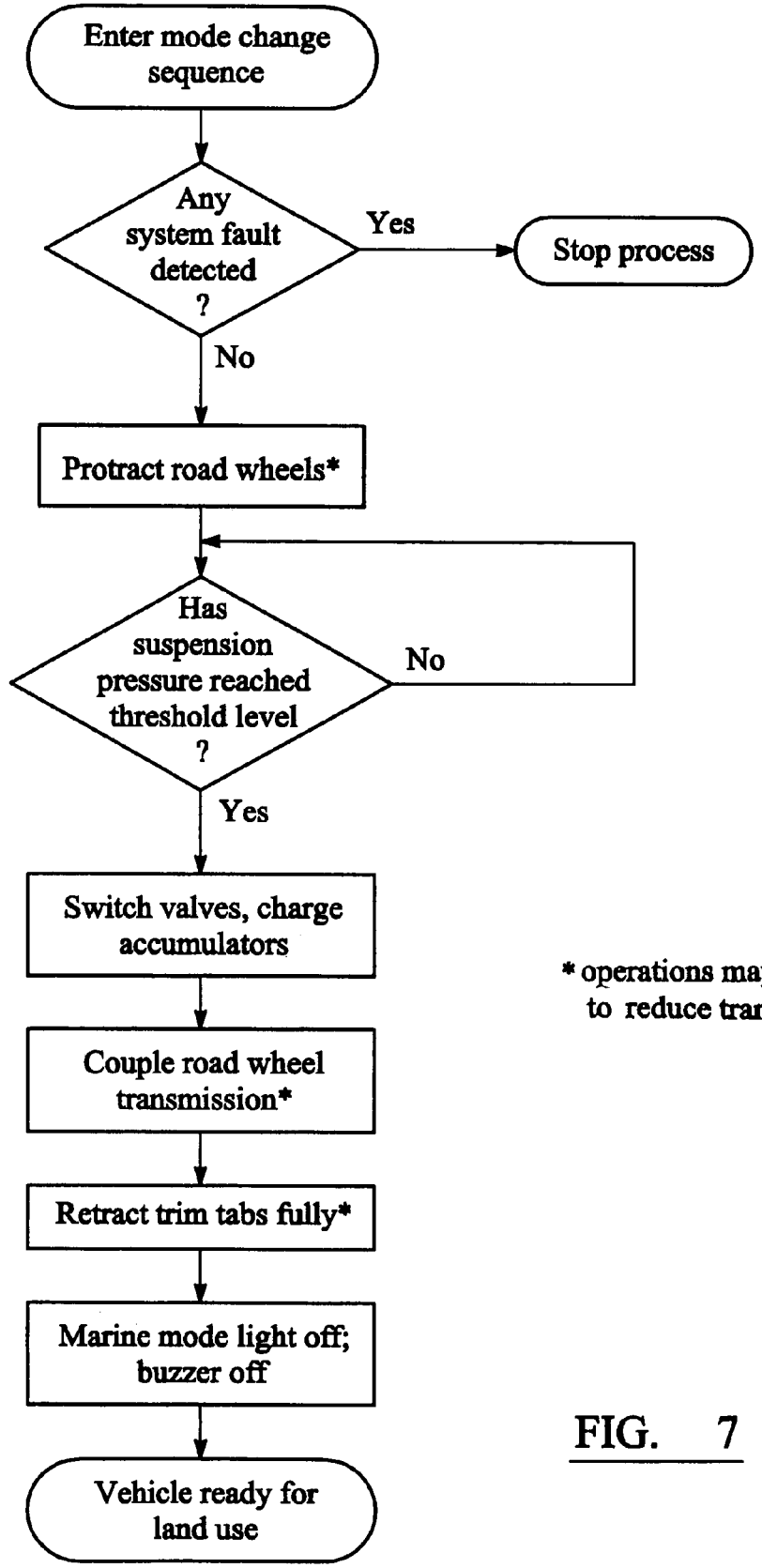
FIG. 7 is a logic diagram for the vehicle of FIG. 1, showing the second stage of mode change from marine to land mode.
Figure 8:
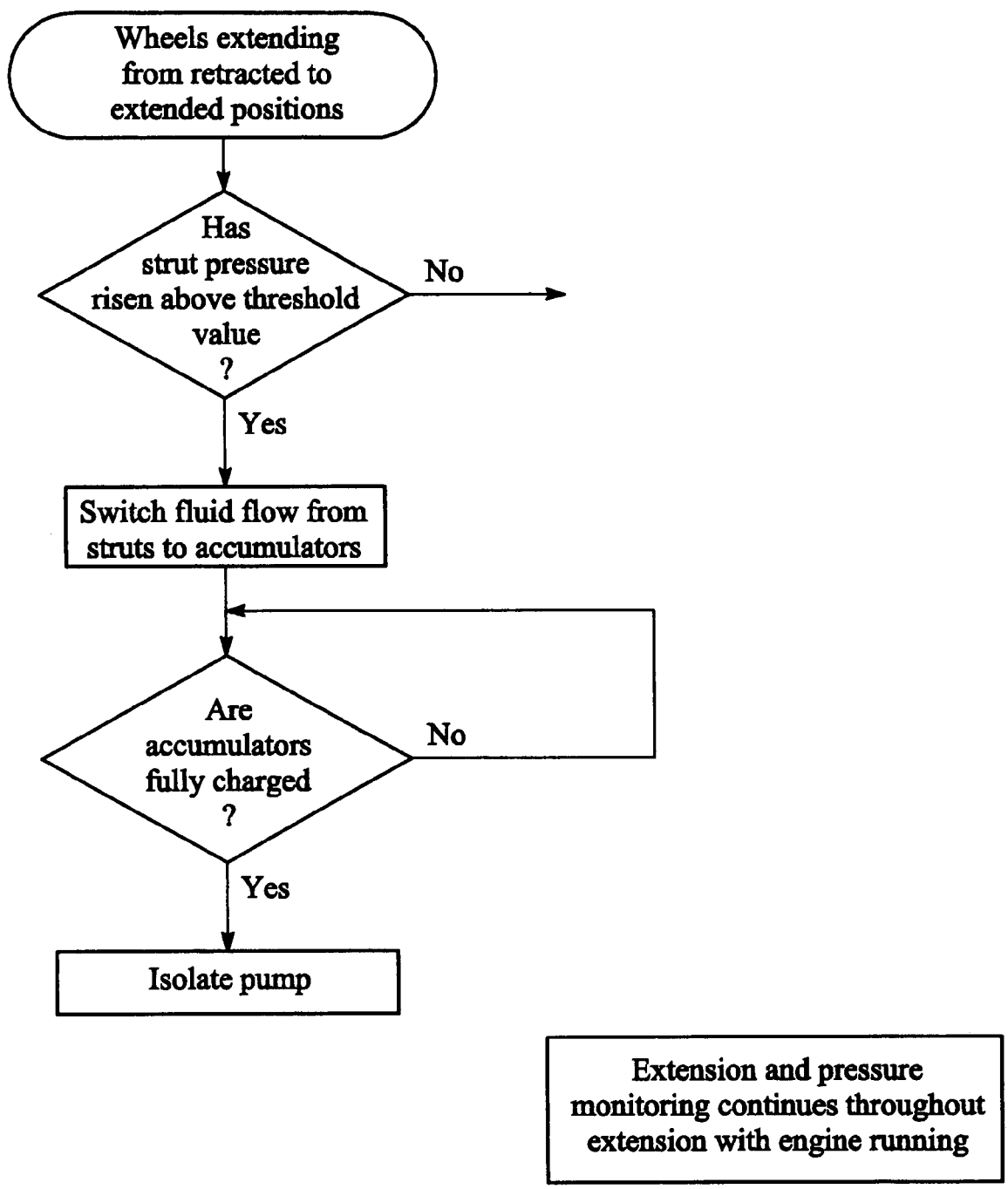
FIG. 8 is a logic diagram of hydraulic switching arrangements for the vehicle of FIG. 1.
Figure 9:
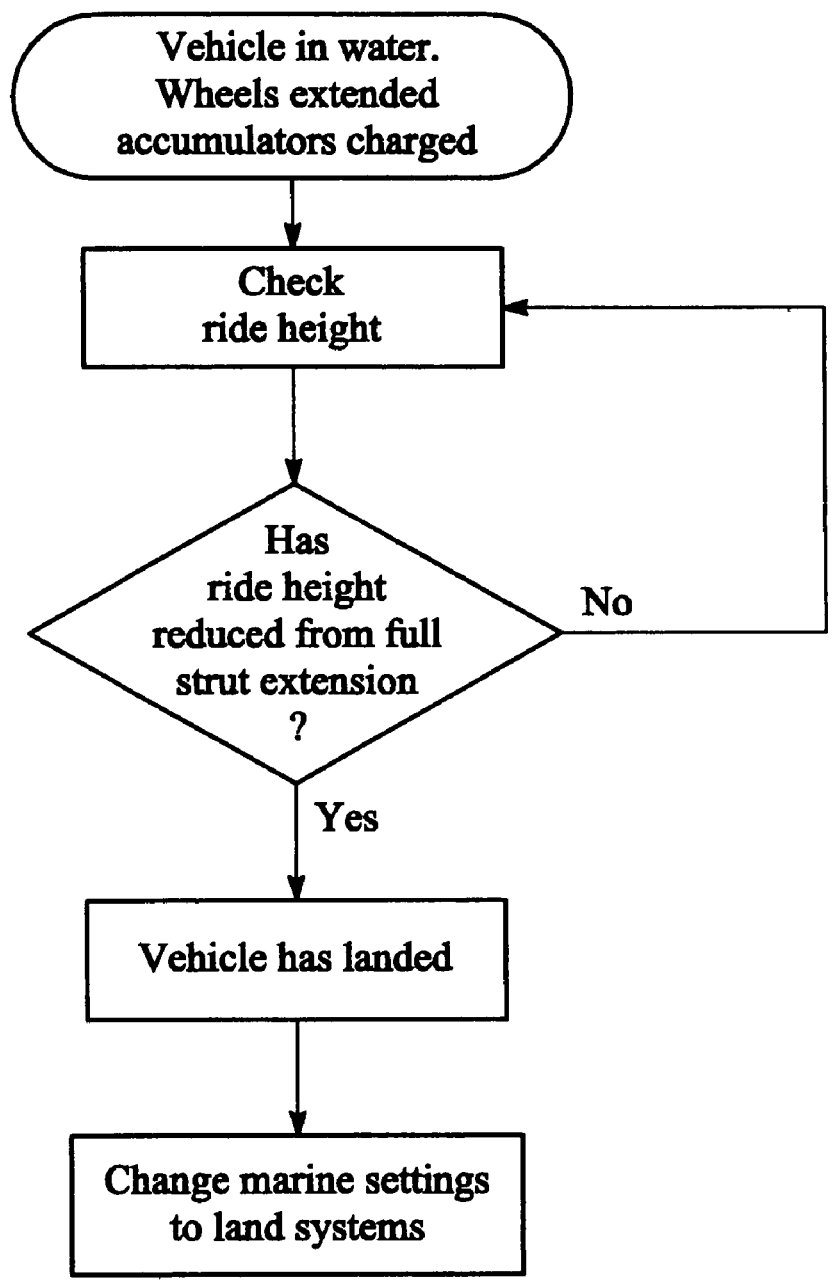
FIG. 9 is a logic diagram showing a mode switching arrangement for the vehicle of FIG. 1.
Figure 10:
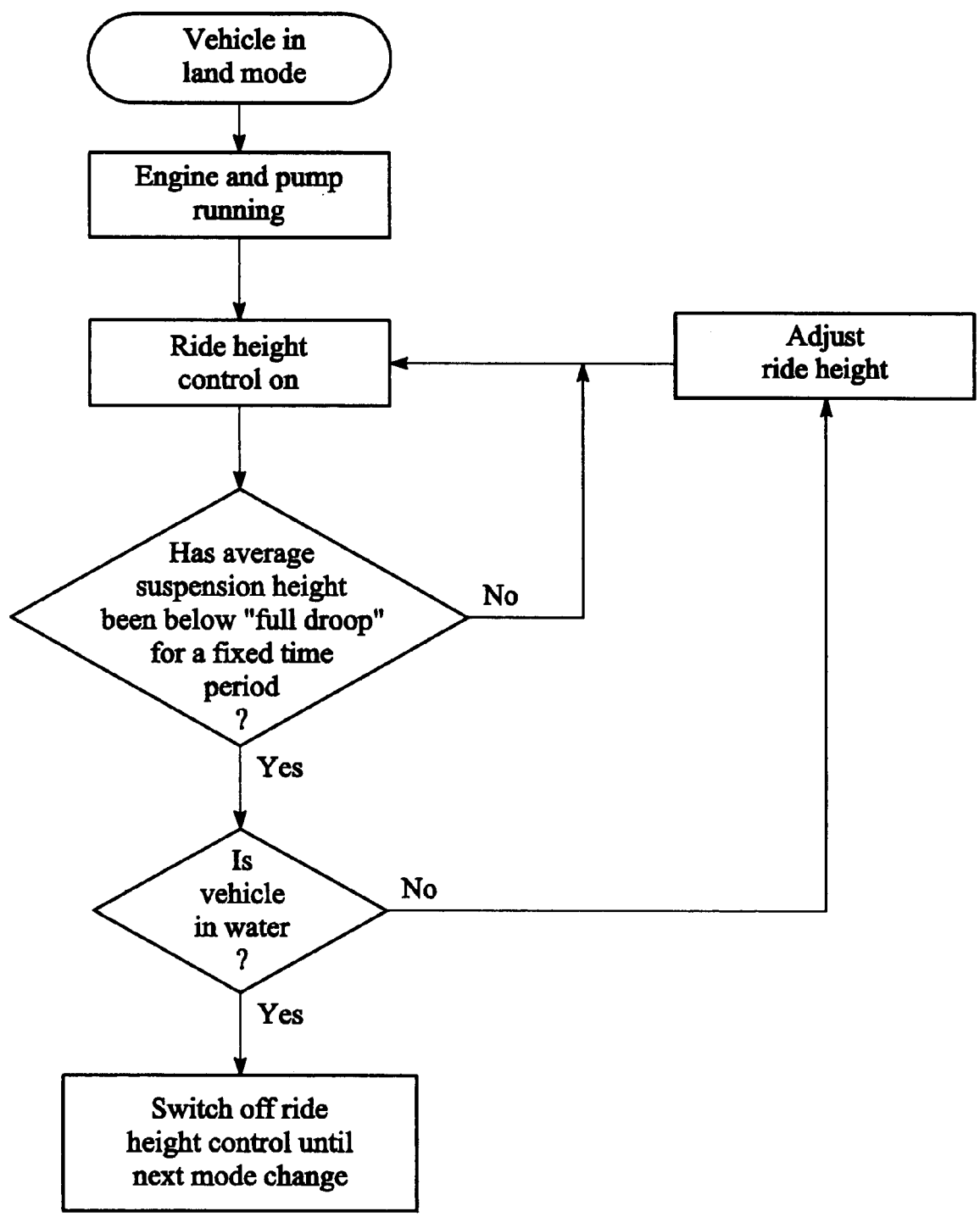
FIG. 10 is a logic diagram showing a ride height control arrangement for the vehicle of FIG. 1.
Figure 11:
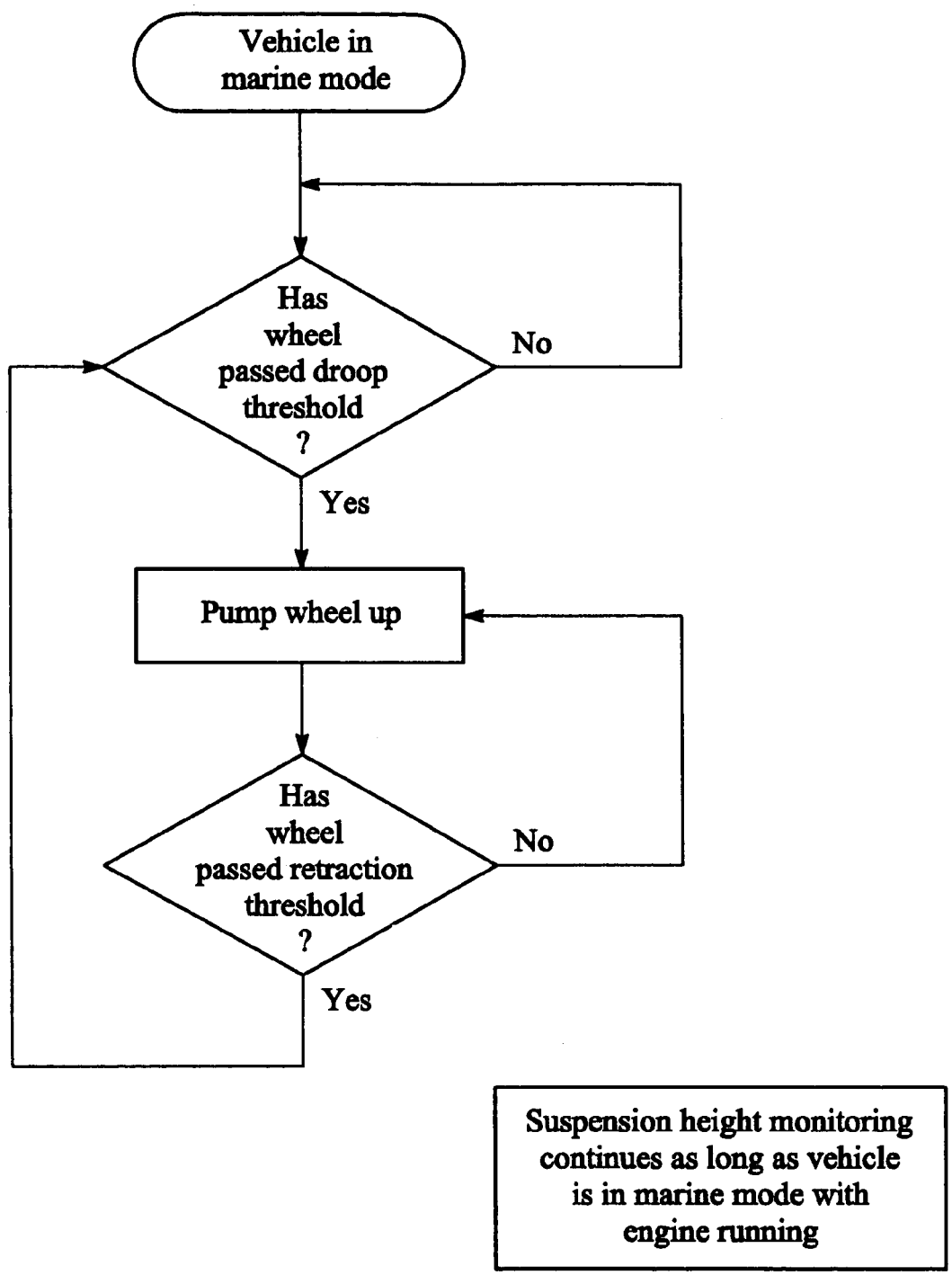
FIG. 11 is a logic diagram showing a suspension droop control arrangement for the vehicle of FIG. 1.

(iii) To change from marine mode to land mode, a suitable level beach or hard slip is approached and mode change switch 50 is activated. After a fault check is made by the controller, shuttle valves 21 and 21' are opened to the reservoir and valves 19 and 19' are opened to the pump to protract the road wheels (2, 2'). When suspension strut 5 is fully extended, or if wheels 2 or 2' encounter significant obstacles before full droop is reached, pressure sensor 13 directs controller 15 to close valve 21 so that accumulator 11 is charged. The trim tabs 42 are retracted and the marine light switches off. The decoupler 52 connects the road wheels to the transmission and the vehicle is now ready for land use (FIG. 6).

It should be noted that the above description assumes that mode changes follow in quick succession. When the vehicle is in either land mode or marine mode for a significant period of time, the wheel cylinders are isolated to effectively lock the wheels up or down.

It will be appreciated that certain deviations from the suspension systems described above may be incorporated without departing from the scope of the invention. For example, although the suspension described above uses linear actuators doubling as suspension struts, packaging requirements may dictate that rotary actuators may have to be used.

Whereas FIGS. 4A and 4B show a single pressure sensor 13 incorporated into a valve body, multiple sensors 13 may be fitted. For example, in FIG. 2, a sensor 13 is shown in line between the upper part 7 of cylinder 5 and accumulator 11; and in FIG. 4, sensor 13 is shown in line between accumulator 11' and valve 9'. Such sensor location allows one sensor to be fitted to each wheel cylinder. This in turn allows controller 15 to determine when to switch valves over depending on an average of, or comparison between, pressure signals from individual cylinders.

In this context, it should be noted that a sensor arranged to detect actuator pressure need not necessarily be mounted directly on the actuator, but may be mounted in any location in open communication with the actuator when pressure measurement is required; for example, on the accumulator.

Where ride height sensors are fitted, a signal from such a sensor indicating that at least one wheel is fully extended may prompt the controller to pressurize at least one accumulator. Furthermore, although the accumulators shown in the figures are all gas charged, spring type accumulators may be used instead. The trim tabs may be positioned by electric or electro-mechanical, rather than electro-hydraulic, actuators.

Although the above embodiments are described using hydraulic fluid struts it is within the scope of the invention to use gas filled struts without individual accumulators for each wheel. Instead, at least one gas filled tank, which may be mounted remotely from the or each actuator, may be used as a reservoir/accumulator connected via individual conduits to a strut for each wheel. Such an arrangement will ensure that sufficient gas is always available to protract the wheels, even if the engine is swamped or stalled.

Furthermore, even if a reservoir or accumulator is provided for each, wheel suspension, the pump may be coupled indirectly to each actuator via at least one further intermediate reservoir. This arrangement could be used, for example, to allow the pump to be driven intermittently, rather than continuously. This arrangement may be preferred in order to reduce fuel consumption and noise; and could be achieved by the use of a clutched, or electrically driven, pump.

Whilst various embodiments of the present invention have been described above, it should be understood that these have been presented by way of example only. Thus it should be understood that various changes may be made without departing from the spirit and scope of the invention.

The invention claimed is:

1. An amphibious vehicle having retractable wheels and a retractable suspension, comprising:
   (i) a hydraulic actuator acting as at least part of a suspension for each wheel,
   (ii) each actuator having a first chamber at a wheel raised first side, and a second chamber at a wheel lowered second side of the actuator,
   (iii) a hydraulic fluid pump arranged to be coupled selectively to either the first or second chamber of each actuator,
   (iv) an accumulator for each actuator and connectable thereto and to the pump,
   (v) each said chamber having at least one switchable valve in a conduit between that said chamber and the pump,
   (vi) a controller arranged to control each said valve,
   (vii) at least one fluid pressure sensor arranged to detect actuator pressure and to indicate to the controller when a predetermined threshold has been reached,
   (viii) the controller being arranged by controlling the valves to extend the wheels from a retracted position in a marine mode to an extended position in land mode, to pressurize each accumulator, and to isolate the actuators and accumulators from the pump,
   (ix) the controller is arranged to pressurize at least one accumulator when a signal is received to indicate that a predetermined suspension pressure has been reached.

2. An amphibious vehicle as claimed in claim 1, where at least one ride height sensor is provided, and arranged to detect at least a retracted and an extended position for the corresponding wheel and to indicate those positions to the controller.

3. An amphibious vehicle as claimed in claim 2, where the controller is arranged to pressurize at least one accumulator when a signal is received to indicate that at least one wheel is fully extended.

4. An amphibious vehicle according to claim 2, further comprising a ride height control system and a water presence sensor, the system being configured to be switched off when at least one wheel is fully extended, and the vehicle is sensed to be in water.

5. An amphibious vehicle according to claim 2, further comprising a droop control system, which is arranged to detect when one or more wheels passes a predetermined droop threshold when the vehicle is in marine mode, and then to activate a system to correct the wheel droop.

6. An amphibious vehicle according to claim 2, where the controller is arranged to change over at least one vehicle system during a changeover from marine mode to land mode, when one or more wheels have rebounded from fully extended positions.

7. An amphibious vehicle according to claim 6, where the controller is arranged to change over at least one vehicle system during a changeover from marine mode to land mode, when all of the read wheels have rebounded from fully extended positions.

8. An amphibious vehicle as claimed in claim 1, where the controller is arranged to average or compare signals from more than one sensor to determine when to pressurize at least one accumulator.

9. A vehicle as claimed in claim 1, wherein the pump is arranged to be driven so as to pump fluid whilst the vehicle is in use, and wherein a bypass valve is provided for the pump so as to enable fluid to be recirculated between a reservoir and the pump when the pump is isolated from the chambers.

10. A vehicle as claimed in claim 9 wherein the pump is connectable by means of at least one switchable valve to a hydraulic wheel decoupler actuator so that at least one said retractable wheel is drivable with the wheels extended and disconnected when the wheels are retracted.

11. A vehicle as claimed in claim 9, wherein the switchable valves comprise at least a first and second pair of shuttle valves arranged so that the first and second chambers are selectively coupled by conduits in a first phase to the pump, in a second phase to the reservoir, and in a third phase, the chambers are isolated from the pump and reservoir.

12. A vehicle as claimed in claim 1, wherein the controller has a manually operable switch arranged to initiate a change from land mode to marine mode and vice versa.

13. A vehicle as claimed in claim 12 wherein the switch is only enabled to change modes if activated for a limited period.

14. A vehicle as claimed in claim 12, wherein the switchable valves comprise at least a first and second pair of shuttle valves arranged so that the first and second chambers are selectively coupled by conduits in a first phase to the pump, in a second phase to the reservoir, and in a third phase, the chambers are isolated from the pump and reservoir.

15. A vehicle as claimed in claim 12, wherein the first and second chambers are connected by a conduit controlled by an on/off valve.

16. A vehicle as claimed in claim 1, wherein a conduit controlled by a first proportional flow valve extends from the switchable valves connected to the chambers to a fluid reservoir, the first flow valve being controlled by the controller to be open when retracting or extending the wheels.

17. A vehicle as claimed in claim 16 wherein a conduit controlled by a second proportional flow valve extends from the pump output to the reservoir, the second flow valve being controlled by the controller to be closed when retracting or extending the wheels.

18. A vehicle as claimed in claim 17 wherein an on/off bypass valve controlled from the controller is in a conduit connecting the input and output sides of the second proportional flow valve.

19. A vehicle as claimed in claim 1 wherein a check valve is arranged in a conduit between the pump and the switchable valves.

20. An amphibious vehicle having retractable wheels and a retractable suspension, comprising:
 (i) a fluid actuator acting as at least part of a suspension for each wheel,
 (ii) each actuator having a first chamber at a wheel raised first side, and a second chamber at a wheel lowered second side of the actuator,
 (iii) a fluid pump arranged to be coupled selectively to either the first or second chamber of each actuator,
 (iv) at least one fluid reservoir connectable to the actuators,
 (v) each said chamber having at least one switchable valve in a conduit between that said chamber and the pump,
 (vi) a controller arranged to control each said valve,
 (vii) at least one right height sensor arranged to detect at least a retracted and an extended position for the corresponding wheel and to indicate those positions to the controller,
 (viii) a water presence sensor being arranged to indicate to the controller that the vehicle is in water, and the controller being at least arranged to maintain the wheels in an extended position in the presence of water on the water sensor,
 (ix) the controller is arranged to maintain one or more specified ride height settings according to signals received from said ride height sensor(s); and to suspend such ride height maintenance when the wheels are fully extended, and the vehicle is in water.

21. A vehicle as claimed in claim 20 wherein the pump is arranged to be driven so as to pump fluid whilst the vehicle is in use, and wherein a bypass valve is provided for the pump so as to enable fluid to be recirculated between a pump reservoir and the pump when the pump is isolated from the chambers.

22. A vehicle as claimed in claim 21 wherein the pump is connectable by means of at least one switchable valve to a hydraulic wheel decoupler actuator so that at least one said retractable wheel is drivable with the wheels extended and disconnected when the wheels are retracted.

23. A vehicle as claimed in claim 21 wherein the switchable valves comprise at least a first and second pair of shuttle valves arranged so that the first and second chambers are selectively coupled by conduits in a first phase to the pump, in a second phase to the reservoir, and in a third phase, the chambers are isolated from the pump and pump reservoir.

24. A vehicle as claimed in claim 23 wherein a conduit controlled by a first proportional flow valve extends from the switchable valves connected to the chambers to the pump reservoir, the first flow valve being controlled by the controller to be open when retracting or extending the wheels.

25. A vehicle as claimed in claim 24 wherein a conduit controlled by a second proportional flow valve extends from the pump output to the pump reservoir, the second flow valve being controlled by the controller to be closed when retracting or extending the wheels.

26. A vehicle as claimed in claim 25 wherein an on/off bypass valve controlled from the controller is in a conduit connecting the input and output sides of the second proportional flow valve.

27. A vehicle as claimed in claim 20, wherein the controller is operable to initiate a change from land mode to marine mode and vice versa.

28. A vehicle as claimed in claim 27 wherein a switch is provided to change modes if activated for a limited period.

29. A vehicle as claimed in claim 20 wherein the first and second chambers are connected by a conduit controlled by an on/off valve.

30. An amphibious vehicle having retractable wheels and a retractable suspension, comprising:
 (i) a fluid actuator acting as at least part of a suspension for each wheel,
 (ii) each actuator having a first chamber at a wheel raised first side, and a second chamber at a wheel lowered second side of the actuator,
 (iii) a fluid pump arranged to be coupled selectively to either the first or second chamber of each actuator,
 (iv) each said chamber having at least one switchable valve in a conduit between that said chamber and the pump,
 (v) a controller arranged to control each said valve,
 (vi) at least one wheel height sensor for each wheel arranged to detect at least a retracted and extended position and to indicate those positions to the controller,
 (vii) the controller being arranged to control the valves to individually adjust the relative fluid capacities of the first and second chambers of each actuator,
 (viii) the or each wheel height sensor is arranged to detect when one or more wheels passes a predetermined droop threshold when the vehicle is in marine mode, and then to activate at least one said actuator to correct the wheel droop.

31. A vehicle as claimed in claim 30 wherein the pump is arranged to be driven so as to pump fluid whilst the vehicle is in use, and wherein a bypass valve is provided for the pump so as to enable fluid to be recirculated between a reservoir and the pump when the pump is isolated from the chambers.

32. A vehicle as claimed in claim 31 wherein the pump is connectable by means of at least one switchable valve to a hydraulic wheel decoupler actuator so that at least one said retractactable wheel is drivable with the wheels extended and disconnected when the wheels are retracted.

33. A vehicle as claimed in claim 31 wherein the switchable valves comprise at least a first and second pair of shuttle valves arranged so that the first and second chambers are selectively coupled by conduits in a first phase to the pump, in a second phase to the reservoir, and in a third phase, the chambers are isolated from the pump and reservoir.

34. A vehicle as claimed in claim 30, wherein the controller has a manually operable switch arranged to initiate a change from land mode to marine mode and vice versa.

35. A vehicle as claimed in claim 34 wherein the switch is only enabled to change modes if activated for a limited period.

36. A vehicle as claimed in claim 30 wherein the first and second chambers are connected by a conduit controlled by an on/off valve.

37. A vehicle as claimed in claim 30 wherein a conduit controlled by a first proportional flow valve extends from the switchable valves connected to the chambers to the fluid reservoir, the first flow valve being controlled by the controller to be open when retracting or extending the wheels.

38. A vehicle as claimed in claim 37 wherein a conduit controlled by a second proportional flow valve extends from the pump output to the reservoir, then second flow valve being controlled by the controller to be closed when retracting or extending the wheels.

39. A vehicle as claimed in claim 38 wherein an on/off bypass valve controlled from the controller is in a conduit connecting the input and output sides of the second proportional flow valve.

40. A vehicle as claimed in claim 30 wherein a check valve is arranged in a conduit between the pump and the switchable valves.

* * * * *